US011359171B2

(12) United States Patent
Vason et al.

(10) Patent No.: US 11,359,171 B2
(45) Date of Patent: Jun. 14, 2022

(54) WINE-MAKING PROCESS AND PROCESS OF FILTERING A GUM ARABIC FOR WINE-MAKING USE

(71) Applicant: ENOLOGICA VASON S.P.A., San Pietro in Cariano (IT)

(72) Inventors: Albano Vason, San Pietro in Cariano (IT); Gianmaria Zanella, Sant'Ambrogio di Valpolicella (IT); Marco Adolfo Marconi, Fosse di Sant'Anna D'Alfaedo (IT)

(73) Assignee: ENOLOGICA VASON S.P.A., San Pietro in Cariano (IT)

( * ) Notice: Subject to any disclaimer, the term of this patent is extended or adjusted under 35 U.S.C. 154(b) by 252 days.

(21) Appl. No.: 16/591,776

(22) Filed: Oct. 3, 2019

(65) Prior Publication Data
US 2020/0109360 A1 Apr. 9, 2020

(30) Foreign Application Priority Data
Oct. 3, 2018 (IT) .................. 102018000009116

(51) Int. Cl.
*C12G 1/00* (2019.01)
*B01D 61/14* (2006.01)
*A23L 29/25* (2016.01)

(52) U.S. Cl.
CPC ............... *C12G 1/00* (2013.01); *A23L 29/25* (2016.08); *B01D 61/147* (2013.01); *B01D 2311/04* (2013.01); *B01D 2315/10* (2013.01)

(58) Field of Classification Search
CPC .. C12G 1/00; C12C 5/02; C12H 1/063; C08B 37/0087; C08L 5/00; A23L 2/62;
(Continued)

(56) References Cited

U.S. PATENT DOCUMENTS

2010/0086667 A1  4/2010 Lankhorst et al.
2012/0132595 A1* 5/2012 Bornia ................... B01D 65/02
                                                      210/103

FOREIGN PATENT DOCUMENTS

KR    101252120 B1    4/2013
MD         763 Z     11/2014
WO   20040099361 A1   11/2004

OTHER PUBLICATIONS

Decloux, M., Dornier, M., Gratius, I., "Crossflow microfiltration of gum arabic solutions" Comparison of the classical system with the co-current permeate flow system, International Journal of Food Science and Technology, 1996, 31, 153-166 (Year: 1996).*

(Continued)

*Primary Examiner* — James C Goloboy
(74) *Attorney, Agent, or Firm* — Mark M. Friedman

(57) ABSTRACT

Wine-making process comprising a first step of arranging "Acacia Verek" raw gum arabic and a second step of arranging a wine to be bottled, a step of dissolving the raw gum arabic in water in order to obtain raw gum arabic in solution with a concentration of gum arabic comprised between 5 and 50%, a step of filtering the raw gum arabic in solution by means of a tangential filter provided with synthetic membrane with nominal porosity comprised between 0.5 and 3 µm in order to obtain filtered gum arabic in solution with a concentration of gum arabic comprised between 5 and 40%, a step of admixing the filtered gum arabic in solution in the wine to be bottled in order to obtain a wine to be bottled admixed with gum arabic, and finally a step of microfiltrating the wine to be bottled admixed with gum arabic.

11 Claims, 1 Drawing Sheet

(58) Field of Classification Search
CPC ... A23L 29/25; B01D 61/147; B01D 2311/04; B01D 2315/10
See application file for complete search history.

(56) References Cited

OTHER PUBLICATIONS

International Oenological Codex, Gum arabic, 2000, retrieved from the internet at < https://www.oiv.int/public/medias/4081/e-coei-1-gomara.pdf> on Aug. 6, 2021 (Year: 2000).*

Eisenman, L., "The Home Winemakers Manual", 1998, p. 102, retrieved from the internet at < http://www.valleyvintner.com/NewWeb/HomeWineMakersManual.pdf> on Aug. 6, 2021 (Year: 1998).*

\* cited by examiner

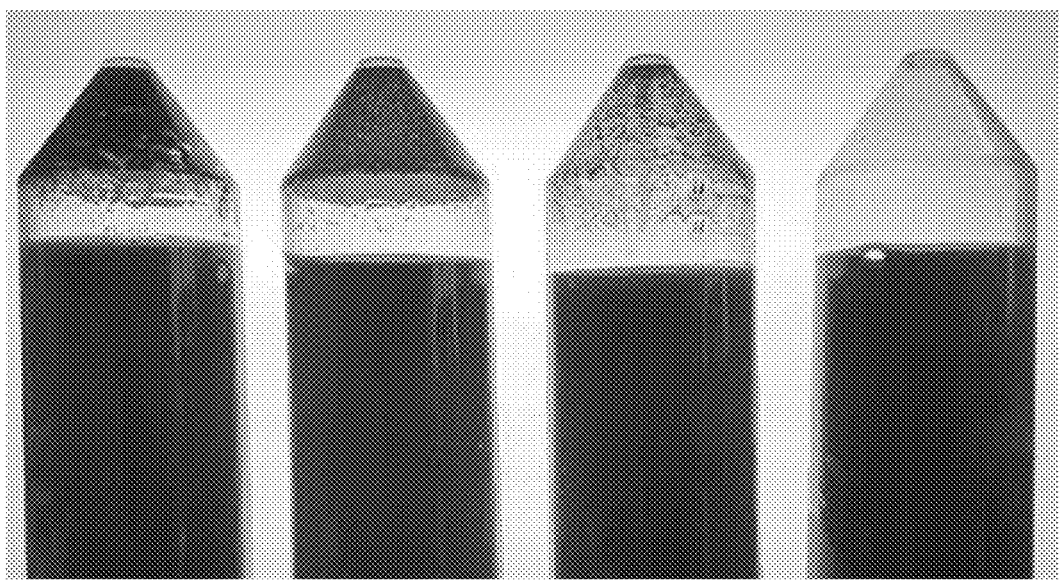

WINE-MAKING PROCESS AND PROCESS OF FILTERING A GUM ARABIC FOR WINE-MAKING USE

FIELD OF APPLICATION

The present invention regards a wine-making process and a process of filtering a gum arabic for wine-making use, according to the preamble of the respective independent claims.

The present process for filtration is intended to attain a filtered gum arabic advantageously employable in the wine-making field for treating enological liquids without modifying the filterability characteristics of the enological liquid to which it is added.

More particularly, the filtered gum arabic produced with the present process for filtration is advantageously employable in wine-making processes for the colloidal stabilization of the wine, in particular in the final steps of production of the wine itself, preferably before the microfiltration which precedes its packaging.

The present filtration process and wine-making process therefore have optimal use in the enological field of industrial wine production.

STATE OF THE ART

As is known, for the commercialization of bottled wines, it is requested not only that the wine be limpid at the time of bottling but also that it remains such over time, above all for wines intended for long aging, e.g. in a cellar.

In order to have the bottled wine maintain its color and clarity characteristics over time, specific colloidal stabilization treatments of the wine are employed, preferably in proximity to the bottling steps.

Indeed, as is known, wine is a complex colloidal system, where the colloids can comprise proteins, polysaccharides and protein-polyphenol and polysaccharide-polyphenol complexes which are maintained under liquid dispersion in the wine by a set of chemical-physical conditions (sometimes very unstable) which prevent the aggregation and the flocculation thereof.

The chemical-physical conditions for the wine stabilization might not be present even after the wine has been bottled, e.g. following temperature jumps or due to spontaneous aggregations that can occur between the colloids of the wine itself.

Presently, in the wine-making field, numerous treatments are known aimed to increase the colloidal stability of the wine even after the bottling.

In particular, the gum arabic is widely employed for preventing undesired flocculation or deposits which frequently appear in wines after the exposure to low temperatures or after filtration. Indeed, due to its colloidal action, gum arabic is a good stabilizing agent of red wines and white wines alike.

Other recognized effects due to the use of gum arabic in wine-making, and more or less seen in all wine types enriched with such substance, include an increase of the aromatic perception, an increased softness of the taste sensation and a more marked persistence of the perlage in sparkling wines.

In addition, especially in the red wines admixed with gum arabic, there is a marked stabilization of the color due to a reduction of the precipitations of pigment substances, which remain in colloidal solution.

For all the aforesaid reasons, it is therefore common practice to dissolve gum arabic in wines, and in particular it is known to dissolve and add gum arabic in the wine before or simultaneously with the bottling step.

The gum arabic for wine-making use present on the market is of natural origin and derives from the exudate of the bark of acacia plants. In particular, the two species of acacia admitted for use in wine-making are "Acacia Verek" (also known with the name "Acacia Senegal") and "Acacia Seyal", as reported in the Codex Oenologique International and more precisely according to the COEI-I-GOMARA resolution of 2000.

Both Acacia Verek and Acacia Seyal produce gum arabic in the form of balls (rough drops of exudate), which are left to dry up to complete solidification and then collected. Subsequently, the dried balls are ground and reduced into powder, or they are placed on the market as is.

Presently, processes are known for filtering the gum arabic which provide for dissolving the raw gum arabic in water and, subsequently, filtering such solution of raw gum arabic through multiple filtration stages, up to obtaining a solution of filtered gum arabic provided with a desired micrometry.

More particularly, filtration processes are known which provide for filtering the solution of raw gum arabic by means of plate filters, in which the raw gum arabic solution is thrust through a plurality of suitable layers, with different micrometries, constituted by cellulose and/or perlite.

In addition, it is known to filter raw gum arabic solutions by means of cartridge filters or by means of D.E. filters. More in detail, the cartridge filters are provided with filtering means constituted by folded sheets, e.g. made of paper, polymer, fabric or still other material, which are superimposed in various layers and wound in cylinders; otherwise, the filtering means of the D.E. filters are constituted by layers of mineral flours, diatoms, cellulose or an assembly of the preceding elements, through which the solution of raw gum arabic to be filtered is thrust.

Following the filtration processes of known type briefly described above, one obtains a filtered gum arabic solution, which appears as a viscous liquid with a white-yellowish color, with concentrations of gum arabic of about 20% or higher.

Such solution of filtered gum arabic can subsequently be employed as is (liquid), or it can be newly dried in order to reduce storage volumes.

In particular, the gum arabic filtered with the filtration processes of the above-described known type is admixed with the wine to be packaged after a roughing filtration of the wine itself and preferably close to packaging time.

More in detail, the wine-making processes of known type employing gum arabic usually provide for a first step for adding filtered gum arabic (whether in liquid or solid form) in a limited quantity of wine or water, in order to ensure the complete dissolution of the gum arabic itself, and subsequently provide for adding—to all the wine to be treated—such limited quantity of water or wine with the solution of gum arabic dissolved at its interior.

In particular, the gum arabic solution is admixed with the wine with variable metered quantities ranging from several mL/hL up to hundreds of mL/hL, depending on the type of wine and on the type of gum arabic.

More in detail, it was found that the gum arabic coming from Acacia Verek has a greater colloidal stabilization effect of the wine than the gum arabic coming from Acacia Seyal. Consequently, the gum arabic coming from Acacia Verek is admixed with the wine with a smaller metered quantity with respect to the gum arabic coming from Acacia Seyal.

In addition, unlike the gum arabic coming from Acacia Seyal, that coming from Acacia Verek has a marked color stabilization effect, especially in red wines.

The wine-making processes of known type briefly described up to now have in practice proven that they do not lack drawbacks.

A main drawback derives from the fact that the gum arabic dissolved in the wine, in order to perform its stabilizing action, is bonded with the colloids in solution in the wine itself, making it difficult to filter at low micrometries.

The packaging processes for the wine generally provide for a final step of microfiltrating the wine itself immediately before the bottling so as to ensure that the wine introduced on the market lacks separable organic substances.

If however the wine has been previously admixed with gum arabic, the microfiltration can be critical, since filter fillings can occur, even up to causing the complete clogging of the filter itself.

In particular, filtration of the wine admixed with gum arabic deriving from Acacia Verek is more difficult than the filtration of the wine admixed with gum arabic deriving from Acacia Seyal. For this reason, in wine-making processes gum arabic at least partially coming from Acacia Seyal normally tends to be used.

However, as mentioned above, the gum arabic coming from Acacia Seyal is much less effective from the colloidal stabilization standpoint than the gum arabic coming from Acacia Verek. Indeed, the latter variety of gum arabic is provided with long polymer chains, which better interact with the colloids of the wine, ensuring a greater stability thereof over time.

In order to be able to obtain a good stabilizing action and prevent the clogging of the filters, it is known to add gum arabic coming from Acacia Verek downstream of the final microfiltration, by means of suitable proportional metering systems.

Also such solution has shown that it does not lack drawbacks. In particular, such proportional metering systems are typical of complex and costly plants and are not applicable in small cellars, in which it is preferable to use a filterable gum arabic, even if of inferior quality.

Up to now, therefore, wine producers must choose if they wish to use colloidal stabilization processes for the wine that employ gum arabic coming from Acacia Verek which is however hard to filter, or gum arabic coming from Acacia Seyal that can be easily filtered.

PRESENTATION OF THE INVENTION

In this situation, the problem underlying the present invention is therefore that of overcoming the drawbacks manifested by the processes of filtering gum arabic of known type, by providing a process for filtration capable of producing a solution of filtered gum arabic which does not alter the filterability characteristics of the wine with which it is admixed, even if such gum arabic is of the type coming from Acacia Verek.

A further object of the present invention is to provide a wine-making process employing gum arabic filtered with the aforesaid process for filtration, and such wine-making process allows admixing the gum arabic with the wine before the microfiltration without clogging the filter and which in any case allows obtaining an effective action of stabilization of the wine itself.

A further object of the present invention is to provide a process for filtration and a wine-making process that are safe and reliable in use.

A further object of the present invention is to provide a process for filtration and a wine-making process that are inexpensive in the attainment thereof.

A further object of the present invention is to provide a process for filtration and a wine-making process which are simple to implement.

BRIEF DESCRIPTION OF THE DRAWINGS

The technical characteristics of the invention, according to the aforesaid objects, can be clearly found in the contents of the below-reported claims and the advantages thereof will be more evident in the following detailed description, made with reference to the experimental results for the product according to the invention, in which FIG. 1 shows a photograph taken of four wine samples after an analysis of the color stabilization effect on an untreated wine, on two wines treated with gum arabics filtered with processes of known type and on a wine treated with a gum arabic filtered with the process that is the object of the present invention.

DETAILED DESCRIPTION OF A PREFERRED EMBODIMENT

The process for filtration of a gum arabic, object of the present invention, provides for obtaining a gum arabic that is filtered and advantageously stable, i.e. lacking impurities which can be present within the raw gum arabic, as it appears in nature, and which advantageously does not alter the filterability characteristics of the wine with which it is admixed.

Indeed, as is known, the gum arabic is a gum of natural origin produced by acacia plants, in particular belonging to the "Acacia Verek" and "Acacia Seyal" species, which produce the gum arabic as exudate from their bark.

More particularly, the aforesaid acacia species exude from their bark a slimy and gelatinous liquid which, by solidifying, forms balls of raw gum arabic.

During the solidification of the liquid exuded from acacia plants, it frequently occurs that foreign bodies, such as dusts, small insects, small branch pieces, leaves and other items remain imprisoned within the balls under formation.

The present process of filtering the gum arabic therefore has the object of filtering the raw gum arabic so as to obtain a filtered gum arabic, substantially lacking foreign bodies at its interior and advantageously usable in subsequent production processes.

In particular, the gum arabic filtered with the filtration process, object of the present invention, is intended to be used in wine-making processes. In particular, in wine-making processes aimed for stabilizing a wine in the steps preceding its bottling, so as to obtain a bottled wine that is stable over time.

The process for filtration of the gum arabic, object of the present invention, comprises a step of arranging a quantity of raw gum arabic, preferably in the form of balls.

In the present document, with the expression "raw gum arabic" preferably it is intended gum arabic which has not undergone preceding filtering processing and preferably which has not undergone roughing or cleaning processing, i.e. it is intended a gum arabic as it appears in nature after its collection.

Advantageously, the raw gum arabic provided for the filtration process, object of the present invention, can derive both from Acacia Verek plants and from Acacia Seyal plants, and can be of pure type, i.e. deriving from only one acacia species, or it can derive from a combination of the two gum arabics that are mixed together.

The present process the provides for a step of dissolving the raw gum arabic in water in order to obtain raw gum arabic in solution with a concentration of gum arabic comprised between 5 and 50%, and preferably between 15 and 35% and still more preferably about 22%.

Preferably, the filtration process also comprises a step of pulverizing the raw gum arabic, before the dissolution step, so as to facilitate the following dissolution step.

In particular, the pulverization step comprises a process of grinding the balls of raw gum arabic aimed to pulverize the aforesaid balls, which are usually provided with a diameter of about 2 cm, so as to bring the corpuscles of ground raw gum arabic to dimensions smaller than 1 mm diameter.

Advantageously, moreover, the dissolution step comprises the introduction of the raw gum arabic, preferably previously ground, tangentially in a water flow, obtaining the aforesaid raw gum arabic in solution.

More in detail, such dissolution step provides for a tangential mixing of the powders of raw gum arabic with a water flow which is thrust in circulation by a pump, so as to facilitate the dissolution of the gum arabic itself.

Advantageously, the gum arabic powders are loaded in a hopper placed above a piping in which the water flow flows and in fluid communication with the latter through a connection duct, which is connected to the piping in which the water flow flows, substantially tangentially to the direction of the water flow itself.

Preferably, moreover, a centrifugal pump is placed at the section where the connection duct is joined to the piping, with its suction branch in flow communication with the piping and with the connection duct, so as to generate reduced pressure in the connection duct itself in order to suction the powders of raw gum arabic loaded in the hopper.

Advantageously, therefore, the raw gum arabic powders are dissolved in a continuous manner within the water flow, preventing the formation of foam and clumps.

In addition, in order to prevent the formation of clumps, downstream of the delivery branch of the centrifugal pump, a mixing chamber is advantageously arranged, provided with at least one impeller adapted to rotate around a rotation axis thereof in order to maintain the raw gum arabic dissolved in circulation within the mixing chamber itself, thus facilitating the mixing of the aforesaid elements and preventing the raw gum arabic from precipitating, being sedimented on the bottom of the mixing chamber.

Advantageously, moreover, the mixing chamber is provided with heating means, such as electric heating elements, susceptible of heating the raw gum arabic dissolved within the mixing chamber up to a temperature comprised between 25 and 45° C., so as to maintain the raw gum arabic in solution and prevent it from being sedimented on the bottom.

Advantageously, the raw gum arabic in solution can also be admixed with further substances, useful in subsequent production processes in which the gum arabic filtered with the filtration process, object of the present invention, is intended to be employed, i.e. it can be admixed with substances aimed to lower the pH of the solution itself (e.g. citric acid or sulfur dioxide), in order to facilitate the dissolution of the raw gum arabic in water: indeed, it was found that the gum arabic is more soluble in a solvent having a pH comprised between 2.7 and 5.

The filtration process, object of the present invention, then comprises a step of filtering the raw gum arabic in solution in order to obtain filtered gum arabic in solution with a concentration of gum arabic comprised between 5 and 40%, preferably between 15 and 35% and still more preferably about 21%.

According to the idea underlying the present invention, the aforesaid filtration step is attained by means of a tangential filter provided with synthetic membrane with nominal porosity comprised between 0.5 and 3 µm, and preferably of about 2 µm.

In particular, the synthetic membrane of the tangential filter is advantageously made of ceramic material, e.g. of dialuminum trioxide, preferably sintered and provided with a porous structure with nominal diameter of the pores comprised between 0.5 and 3 µm.

Preferably, moreover, the tangential filter employed in the filtration step of the present filtration process is advantageously a tangential filter with self-cleaning septum.

For example, in a non-limiting embodiment of the present invention, the synthetic membrane equipping the tangential filter comprises a plurality of ceramic discs arranged in succession facing each other, each of which susceptible of being actuated to be moved with respect to the adjacent discs in order to execute an action of scraping of the raw gum arabic fraction that does not pass through the holes of the membrane itself (i.e. the retentate) so as to allow the self-cleaning of the filter itself.

Preferably, in accordance with the aforesaid embodiment, the tangential filter is provided with a filtration chamber substantially with cylindrical shape in which the ceramic discs of the synthetic membrane are arranged, stacked facing each other in order to create the synthetic membrane of the tangential filter.

In particular, the synthetic membrane thus attained has tubular cylindrical shape and is arranged coaxially with the filtration chamber.

More in detail, the aforesaid synthetic membrane is provided with an external cylindrical surface, deriving from the composition of the external circular edges of the ceramic disks aligned with each other, and is provided with an internal cylindrical surface, deriving from composition of the internal circular edges of the ceramic disks aligned with each other.

Advantageously, moreover, the internal cylindrical surface of the synthetic membrane delimits a flow channel, in which a first fraction of the raw gum arabic in solution (hereinbelow also termed "permeate") is susceptible of flowing, which is filtered through the pores of the synthetic membrane between its external cylindrical surface and its internal cylindrical surface.

In operation, the raw gum arabic in solution is susceptible of flowing along the filtration chamber, between the perimeter walls of the filtration chamber itself and the external cylindrical surface of the synthetic membrane, tangentially to the latter.

The permeate fraction of the raw gum arabic in solution filters through the pores of the synthetic membrane up to penetrating within the flow channel.

In addition, a remaining second fraction of the raw gum arabic in solution (hereinbelow also termed "retentate"), being constituted by bodies provided with diameter greater than the diameter of the pores of the synthetic membrane, cannot be filtered and remains between the perimeter walls of the filtration chamber and the external cylindrical surface of the synthetic membrane.

Advantageously, the ceramic disks that compose the synthetic membrane are susceptible of being actuated to rotate with respect to the central axis thereof, in particular they are susceptible of rotating with respect to each other, facilitating the self-cleaning of the synthetic membrane, i.e. facilitating the scraping of the retentate from the external cylindrical surface of the membrane, facilitating its flow on the cylindrical surface itself and preventing (or slowing) the filling and the clogging of the tangential filter.

Of course, other types of tangential filters with synthetic membrane can be employed in the filtration step of the present filtration process without departing from the protective scope of the present patent. For example, the synthetic membrane can be constituted by tubular ceramic septa, which can be actuated to rotate around their central axis in order to facilitate the self-cleaning of the filter or be fixed in position.

Advantageously, the filtration step is controlled in order to obtain the filtered gum arabic in solution with an NTU value lower than or equal to 10.

More in detail, as is known, the NTU value is the value of the nephelometric turbidity units of a solution and indicates the turbidity of a liquid substance, i.e. its degree of transparency.

In operation, the filtration step is advantageously conducted up to obtaining the filtered gum arabic in solution with the NTU value lower than or equal to 10, which appears as a translucent solution, substantially colorless.

Advantageously, moreover, the filtration step is controlled in order to obtain the filtered gum arabic in solution with a filterability index value lower than or equal to 10, i.e. such to not modify the filterability of the liquid to which it is susceptible of being added.

In particular, the filterability index value of the filtered gum arabic in solution with the present process is calculated by means of a test of filterability which provides for diluting the gum arabic in solution with microfiltered water up to obtaining a sample to be tested with a concentration of 100 mL/hL.

Subsequently, the filterability test provides for filtering the sample to be tested, substantially at ambient temperature, by means of a solid membrane filter made of esters mixed with cellulose, with absolute porosity of 0.65 μm and diameter of the solid membranes equal to 25 mm, in which the sample to be tested is thrust through the solid membranes by a 2 bar filtering pressure, and provides for measuring the time necessary for respectively filtering 200 mL, 400 mL and 600 mL of the aforesaid sample to be tested.

In particular, T1 defines the time necessary for filtering 200 mL of sample to be tested, T2 defines the time necessary for filtering 400 mL of sample to be tested and T3 defines time necessary for filtering 600 mL of sample to be tested.

The filterability index IF is then defined as:

$$IF = T2 - 2*T1.$$

Advantageously, from the values measured during the aforesaid filterability test, it is also possible to define a modified filterability index IFM equal to:

$$IFM = (T3-T1) - 2*(T2-T1);$$

and a maximum filterable volume Vmax equal to:

$$Vmax = 400 + (400*T1)/IF.$$

Advantageously, the filtered gum arabic in solution with the process, object of the present invention, has a modified filterability index IFM lower than or equal to 10, and a maximum filterable volume Vmax at least equal to 10,000.

In order to be able to compare the gum arabic filtered with the present filtration process with gum arabics of known type, the aforesaid filterability test was executed on two samples of gum arabic, in particular on a sample of gum arabic produced by Acacia Verek plants and on a sample of gum arabic coming from Acacia Seyal plants, which are filtered with filtration processes of known type by means of layer filters.

In addition, the aforesaid filterability test was also executed on a sample of unfiltered raw gum arabic (in particular produced by an Acacia Verek plant).

The results obtained with the aforesaid filterability tests are indicated in the following table 1.

TABLE 1

| GUM ARABIC | IF | IFM | Vmax | NTU |
| --- | --- | --- | --- | --- |
| Unfiltered Acacia Verek | N.P. | N.P. | N.P. | 234 |
| Acacia Verek filtered with known process | 29.4 | 37.4 | 1.034 | 56.2 |
| Acacia Verek filtered with present process | 0.1 | 0.1 | 11.120 | 5.1 |
| Acacia Seyal filtered with known process | 0.1 | 0.2 | 9.520 | 13.8 |

In particular, it was not possible to obtain any value of filterability of the Acacia Verek raw gum arabic, since such gum arabic cannot be filtered by means of the aforesaid process of the filterability test.

With regard to the Acacia Verek gum arabic filtered with known process and with the present process, a significant decrease of the filterability indices and modified filterability indices IF, IFM was found, which pass respectively from values equal to 29.4 and 37.4 to values lower than one, and in particular both equal to 0.1. In addition, the values of the filterability and modified filterability indices IF, IFM measured for the Acacia Verek gum arabic filtered with the present process are very close to the values measured for the Acacia Seyal gum arabic filtered with known processes, which respectively are equal to 0.1 and 0.2.

A significant variation was also found between the value of maximum filterable volume Vmax measured for Acacia Verek gum arabic filtered with known process and with the present process. In particular, the maximum filterable volume Vmax is 1034 in the case of gum arabic filtered with known process and 11120 in the case of filtered gum arabic with the present process.

Also in this case, the value of maximum filterable volume Vmax measured for the Acacia Verek gum arabic filtered with the present process is much closer to the value of Vmax measured for the Acacia Seyal gum arabic filtered with known process, which is equal to 9520.

For the various samples tested with the filterability test, also the nephelometric turbidity unit value was evaluated. As can be seen in the table, the NTU value of the Acacia Verek gum arabic falls from 234 in the case of raw gum arabic, to 56.2 in the case of gum arabic filtered with known process, to 5.1 in the case of gum arabic filtered with the present process.

In particular, the NTU value measured for Acacia Verek gum arabic filtered with the present process is also significantly lower than the NTU value measured for the gum arabic of Acacia Seyal filtered with known process, which is equal to 13.8.

From the aforesaid obtained results, it is clear that the filtration process, object of the present invention, allows obtaining a filtered gum arabic which—even if produced by Acacia Verek plants—has filterability characteristics comparable to those of a gum arabic produced by Acacia Seyal plants, and has an NTU value significantly lower than the value measured for a gum arabic produced by Acacia Seyal plants.

The Acacia Verek gum arabic filtered with the present process is therefore advantageously substitutable with any one Acacia Seyal gum arabic, without involving modifications of filterability for the liquid to which it is susceptible of being added.

Of course, the gum arabic filtered with the present process can also be produced by Acacia Seyal plants or be a combination of the two gum arabics, without departing from the protective scope of the present patent.

Also forming the object of the present invention is a wine-making process in particular of the type aimed to ensure the colloidal stability of a bottled wine.

The wine-making process, object of the present invention, comprises a first step of arranging Acacia Verek raw gum arabic, and a second step of arranging a wine to be bottled, i.e. an enological liquid which has already undergone the steps of crushing, fermentation, clarification and refinement, also not in this order, which are to be intended of known type and hence not described in the present document.

In particular, the wine to be bottled arranged for the wine-making present process is advantageously contained within tanks or casks and is intended to be transferred into smaller containers, such as bottles, for retail sales.

The present process then provides for a step of dissolving the raw gum arabic in water in order to obtain raw gum arabic in solution with a concentration of gum arabic comprised between 5 and 50%.

According to the idea underlying the present invention, the present wine-making process then comprises a step of filtering the raw gum arabic in solution by means of a tangential filter provided with synthetic membrane with nominal porosity comprised between 0.5 and 3 µm in order to obtain filtered gum arabic in solution with a concentration of gum arabic comprised between 5 and 40%, and preferably with a concentration of gum arabic of about 21%.

In particular, the synthetic membrane of the tangential filter employed in the aforesaid filtration step is advantageously made of ceramic material and preferably is of the above-described type.

Subsequently, the present process comprises a step of admixing the filtered gum arabic in solution within the wine to be bottled in order to obtain a wine to be bottled admixed with gum arabic.

In particular, the aforesaid admixing step advantageously comprises a first step of mixing the filtered gum arabic in solution with a first fraction of the wine to be bottled, in order to obtain a wine fraction strongly admixed with gum arabic. Subsequently, a second step is provided for mixing the wine fraction strongly admixed with gum arabic with a remaining second fraction of the wine to be bottled, in order to obtain the wine to be bottled admixed with gum arabic.

Advantageously, the first mixing step can be manually executed and the second mixing step can be executed by means of stirrers or by means of pumps, for the purpose of facilitating a uniform mixing of the entire arranged amount of wine to be bottled.

Of course, both mixing steps can be executed manually or mechanically by means of stirrers or pumps, without departing from the protective scope of the present patent.

The aforesaid adding step advantageously provides for admixing, with the wine to be bottled, a metered quantity of filtered gum arabic in solution comprised between 30 and 600 mL/hL depending on the type of wine and on the concentration of gum arabic present in the solution.

Following the aforesaid dissolution step, the wine-making present process comprises a step of microfiltrating the wine to be bottled admixed with gum arabic.

In particular, the wine to be bottled admixed with gum arabic is preferably filtered by means of a membrane with nominal porosity equal to or greater than 0.45 µm (e.g. equal to 1 µm, 0.65 µm, or 0.45 µm) in order to eliminate organic substances suspended in the wine to be bottled.

Advantageously, as indicated above, the wine-making present process finally comprises a step of bottling the wine to be bottled admixed with gum arabic, following the microfiltration step.

Preferably, the filtration step of said wine-making process is controlled in order to obtain a filtered gum arabic in solution, which has an NTU value lower than or equal to 10 and preferably also has a filterability index IF, IFM both lower than or equal to 10, and a maximum filterable volume Vmax equal to at least 10000.

In addition, the wine-making process advantageously comprises one or more of the steps of the above-described filtration process.

In particular, preferably the wine-making process comprises a step of pulverizing the raw gum arabic, before the dissolution step, and during such dissolution step the raw gum arabic is preferably introduced tangentially in a water flow in order to obtain a raw gum arabic in solution, to be filtered with a tangential filter with synthetic membrane as described above.

Surprisingly, the wine-making process, object of the present invention, has shown capable of obtaining a wine admixed with Acacia Verek gum arabic which is stable and simultaneously microfilterable before bottling.

FIG. 1 reports the outcome of a stability test executed on a wine that is not admixed with gum arabic, indicated in the FIGURE with the number 1, on a wine admixed with Acacia Verek gum arabic filtered with process of known type (in particular filtered by means of layer filters), indicated in the FIGURE with the number 2, on a wine admixed with Acacia Seyal gum arabic filtered with process of known type (in particular filtered by means of layer filters), indicated in the FIGURE with the number 3, and on a wine admixed with Acacia Verek gum arabic filtered with the present filtration process, indicated in the FIGURE with the number 4.

In addition, the wine number 4 has also undergone the wine-making process, object of the present invention.

In particular, the wines 2, 3, and 4, admixed with gum arabic, were all admixed with a metered quantity equal to 100 mL/hL of gum arabic in order to compare the stabilizing power of the different gum arabics given the same metering.

In addition, the wines 3 and 4, respectively admixed with gum arabic of Acacia Seyal and gum arabic of Acacia Verek filtered with the present process, were treated with an electrodialysis treatment before executing the stability test, so as to ensure the tartaric stability of the tested wine.

The stability test was attained by allowing four samples of the aforesaid four wines to sediment in the containers visible in the photograph of FIG. 1, with the tips of the containers directed downward, for a sedimentation time of six days at a temperature of −4° C. Subsequently, the containers were overturned and arranged with the tips upward, as illustrated in the photograph of FIG. 1. In this manner, it was possible to more clearly observe the sediment quantity that remained on the bottom of the containers (i.e. on the tips thereof).

From the comparison of the four samples, it can be observed that the sample of wine 1, untreated, is highly unstable, indeed it has the greatest concentration of precipitate as it is possible to see from the tip of the first container from the left, which is nearly completely covered with sediments.

Otherwise, the wine 2 admixed with Acacia Verek gum arabic filtered with process of known type (second container from the left), at the end of the stability test appears tartarically unstable, as can be seen with the presence of sediments on the tip of the container, though presumably stable with regard to the color fraction. Indeed such sample did not undergo electrodialysis before the stability test and hence is tartarically unstable.

The wine 3 admixed with gum arabic of Acacia Seyal filtered with process of known type (third container from the left) was also treated with electrodialysis in order to ensure the tartaric stability. At the end of the stability test, the wine 3 thus obtained has an unstable color, indeed the tip of the containers is colored red due to the precipitation of colored pigments present in the wine. In addition, from the analysis of FIG. 1, the wine 3 is tartarically stable due to the electrodialysis treatment.

Finally, the wine 4 admixed with Acacia Verek gum arabic filtered with the present filtration process (fourth sample from the left) was also treated with the wine-making process, object of the present invention, and with electrodialysis in order to ensure the tartaric stability. At the end of the stability test, the wine 4 thus obtained has stable color, indeed the tip of the containers lacks sediments. In addition, the wine 4 is tartarically stable, since only negligible crystallization nuclei are present.

The process of filtering gum arabic thus conceived therefore attains the pre-established objects, allowing the obtainment of a filtered gum arabic which is employable upstream of processes of microfiltration of the liquids with which it is admixed, without involving modifications of the filterability of the liquids themselves.

In addition, the wine-making process, object of the present invention, also attains the pre-established objects, allowing the obtainment of a wine admixed with gum arabic, which is microfilterable following the step of dissolving the gum arabic and which allows obtain a wine with stable color.

The invention claimed is:

1. A wine-making process comprising:
   a first step of providing "Acacia Verek" raw gum arabic;
   a second step of providing a wine to be bottled;
   a step of dissolving said raw gum arabic in water in order to obtain raw gum arabic in solution with a concentration of gum arabic of between 5 and 50%;
   a step of filtering said raw gum arabic in solution by means of a tangential filter provided with a synthetic membrane with pore size of between 0.5 and 3 µm in order to obtain filtered gum arabic in solution with a concentration of gum arabic of between 5 and 40%,
   wherein the synthetic membrane equipping said tangential filter comprises a plurality of ceramic discs arranged in succession facing each other and susceptible of being actuated to rotate with respect to the central axis thereof;
   a step of admixing said filtered gum arabic in solution in said wine to be bottled in order to obtain a wine to be bottled admixed with gum arabic;
   a step of microfiltering said wine to be bottled admixed with gum arabic.

2. A wine-making process according to claim 1, wherein in said microfiltration step, said wine to be bottled admixed with gum arabic is filtered by means of a membrane with pore size equal to or greater than 0.45 µm.

3. A wine-making process according to claim 1, further comprising a step of bottling said wine to be bottled admixed with gum arabic, following said microfiltration step.

4. A process of filtering a gum arabic for wine-making use, which comprises:
   a step of providing raw gum arabic;
   a step of dissolving said raw gum arabic in water in order to obtain raw gum arabic in solution with a concentration of gum arabic of between 5 and 50%;
   a step of filtering said raw gum arabic in solution in order to obtain filtered gum arabic in solution with a concentration of gum arabic of between 5 and 40%;
   wherein said filtration step is attained by means of a tangential filter provided with a synthetic membrane with pore size of between 0.5 and 3 µm;
   wherein the synthetic membrane equipping said tangential filter comprises a plurality of ceramic discs arranged in succession facing each other and susceptible of being actuated to rotate with respect to the central axis thereof.

5. A filtration process according to claim 4, wherein said filtration step is controlled in order to obtain said filtered gum arabic in solution with an NTU value lower than or equal to 10.

6. A filtration process according to claim 4, wherein said filtration step is controlled in order to obtain said filtered gum arabic in solution with a filterability index value (IF) lower than or equal to 10.

7. A filtration process according to claim 4, further comprising a step of pulverizing said raw gum arabic, before said dissolution step.

8. A filtration process according to claim 4, wherein said dissolution step comprises the introduction of said raw gum arabic tangentially in a water flow, obtaining said raw gum arabic in solution.

9. A filtration process according to claim 4, wherein said raw gum arabic is "Acacia Verek" gum arabic.

10. A filtration process according to claim 4, wherein said raw gum arabic is "Acacia Seyal" gum arabic.

11. A process of filtering a gum arabic for wine-making use, which comprises:
    a step of providing raw gum arabic;
    a step of dissolving said raw gum arabic in water in order to obtain raw gum arabic in solution with a concentration of gum arabic of between 5 and 50%;
    a step of filtering said raw gum arabic in solution in order to obtain filtered gum arabic in solution with a concentration of gum arabic of between 5 and 40%;
    wherein said filtration step is attained by means of a tangential filter provided with a synthetic membrane with pore size of between 0.5 and 3 µm;
    wherein said dissolution step comprises the introduction of said raw gum arabic tangentially in a water flow, obtaining said raw gum arabic in solution.

* * * * *